(12) United States Patent
Schwab

(10) Patent No.: US 6,719,829 B1
(45) Date of Patent: Apr. 13, 2004

(54) VENTURI AND METHODS FOR PARTICULATE REMOVAL WITH COUNTERFLOW SPRAYS

(75) Inventor: James J. Schwab, Napa, CA (US)

(73) Assignee: EnviroCare International, Inc., Novato, CA (US)

( * ) Notice: Subject to any disclaimer, the term of this patent is extended or adjusted under 35 U.S.C. 154(b) by 9 days.

(21) Appl. No.: 10/132,330

(22) Filed: Apr. 22, 2002

Related U.S. Application Data

(63) Continuation-in-part of application No. 09/577,691, filed on May 22, 2000, now Pat. No. 6,383,260.

(51) Int. Cl.[7] .............................................. B01D 47/10
(52) U.S. Cl. ........................... 95/199; 95/216; 95/224; D96/323; 261/DIG. 54
(58) Field of Search ......................... 96/275, 312, 323; 95/216, 217, 224, 119; 261/DIG. 54

(56) References Cited

U.S. PATENT DOCUMENTS

| | | |
|---|---|---|
| 2,020,850 A | 11/1935 | Myhren et al. |
| 2,913,232 A | 11/1959 | Silverman |
| 3,385,030 A | 5/1968 | Letvin |
| 3,386,712 A | 6/1968 | Dafla |
| 3,406,953 A | 10/1968 | Moore |
| 3,448,562 A | 6/1969 | Wisting |
| 3,601,374 A | 8/1971 | Wheeler |
| 4,012,469 A | 3/1977 | Accortt |
| 4,411,846 A | 10/1983 | Ulrich et al. |
| 4,828,768 A | 5/1989 | Talmor |
| 5,178,653 A | 1/1993 | Litja et al. |
| 5,279,646 A | 1/1994 | Schwab |
| 5,484,471 A | 1/1996 | Schwab |
| 5,512,085 A | 4/1996 | Schwab |
| 5,759,233 A | 6/1998 | Schwab |
| 6,383,260 B1 * | 5/2002 | Schwab |

OTHER PUBLICATIONS

W. Strauss, "Industrial Gas Cleaning,""Particle Collection by Liquid Scrubbing," Pergamon Press Ltd., pp. 318–331, (1966).

Product Brochure for Type CAA Scrubber, "Counter Current Air Atomizing Scrubber for Cleaner Air," Fuller Bulk Handling Corporation, pp. 1–2, no date.

BETE Fog Nozzle, Inc., "Spray Nozzles for Industry, Fire Protection and Pollution Control," at <http://www.bete.com>, 1 pg., Sep. 7, 2001.

"Figure 9—Venturi Scrubber Geometry," 1 pg. (author unknown), no date.

\* cited by examiner

*Primary Examiner*—Duane S. Smith
(74) *Attorney, Agent, or Firm*—Sheppard Mullin Richter & Hampton LLP

(57) ABSTRACT

The present invention provides improved systems and methods for scrubbing gas with a venturi scrubber. A dual spray venturi scrubber, in which a scrubbing liquid is injected upstream and counter to the flow through the venturi, provides for improved scrubbing performance, including efficient and economical scrubbing of fine particles. Specifically, the present invention reduces the scrubbing liquid pumping requirements, improves the scrubber performance, and provides better control of the pressure drop across the venturi scrubber. The control of pressure drop across the venturi can be obtained with no internal mechanisms or upstream spray.

26 Claims, 6 Drawing Sheets

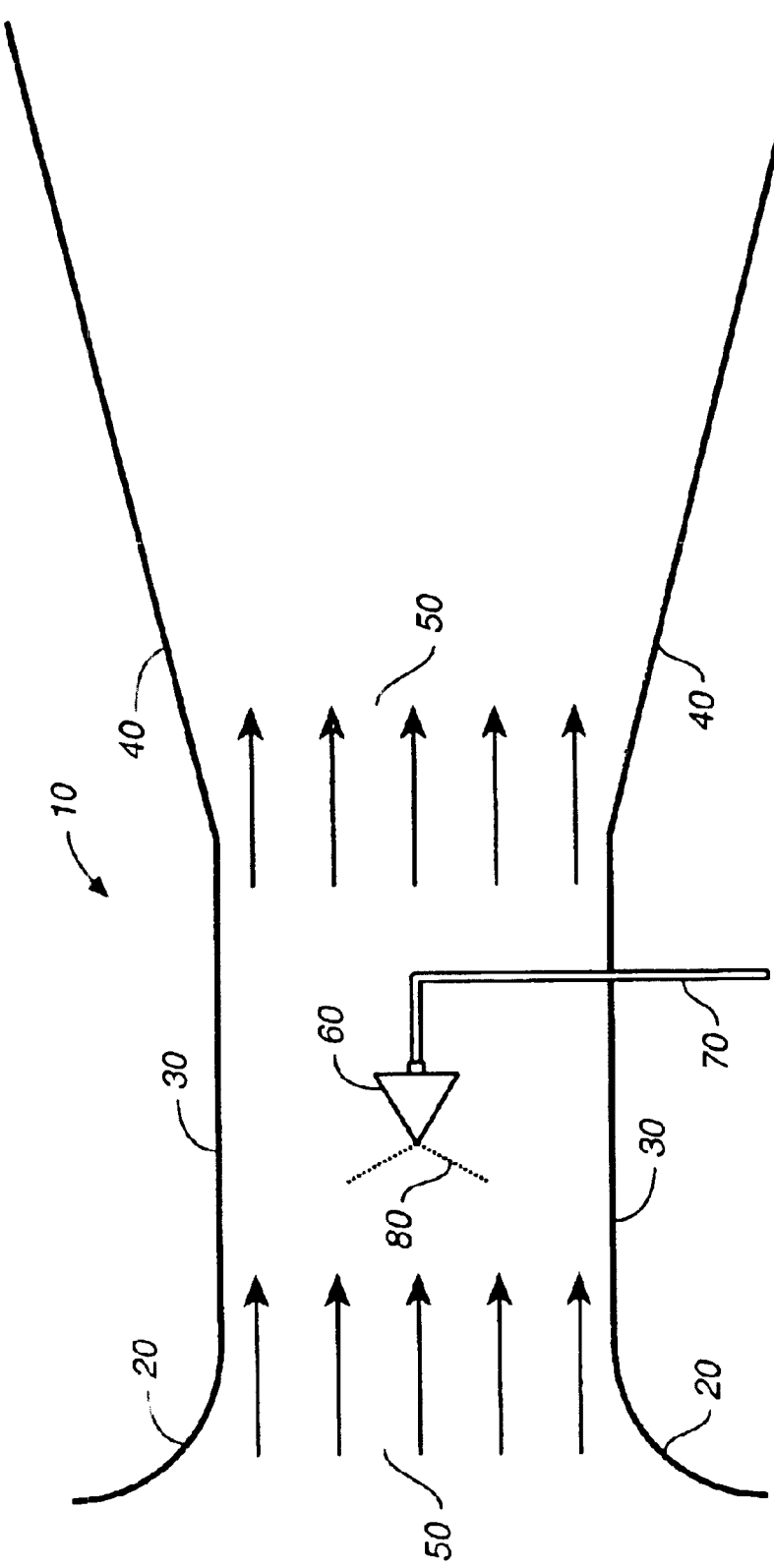
FIG._1

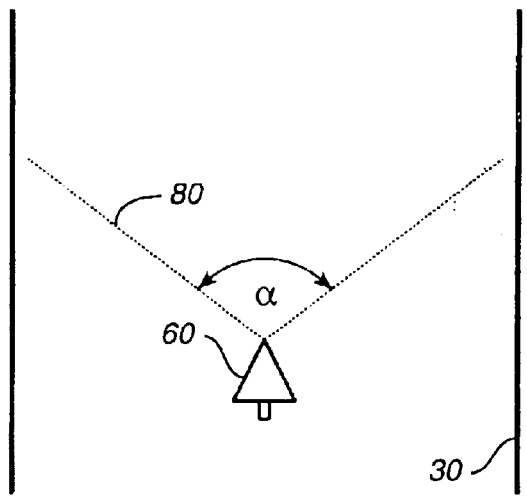
FIG._2
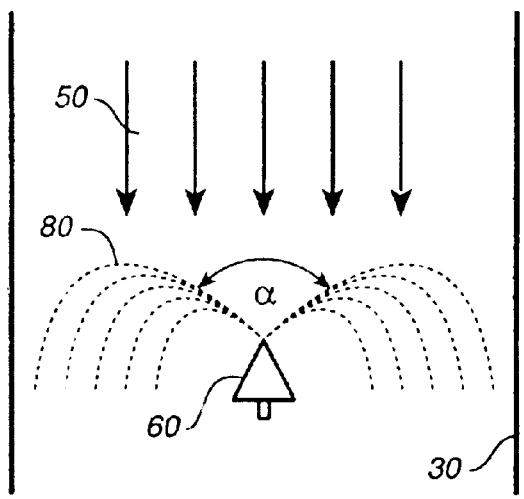
FIG._3
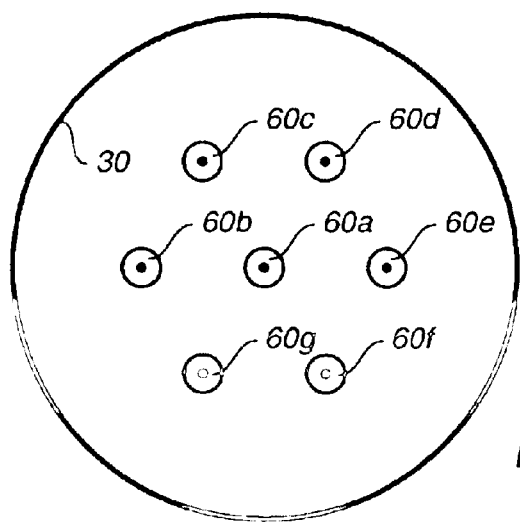
FIG._4

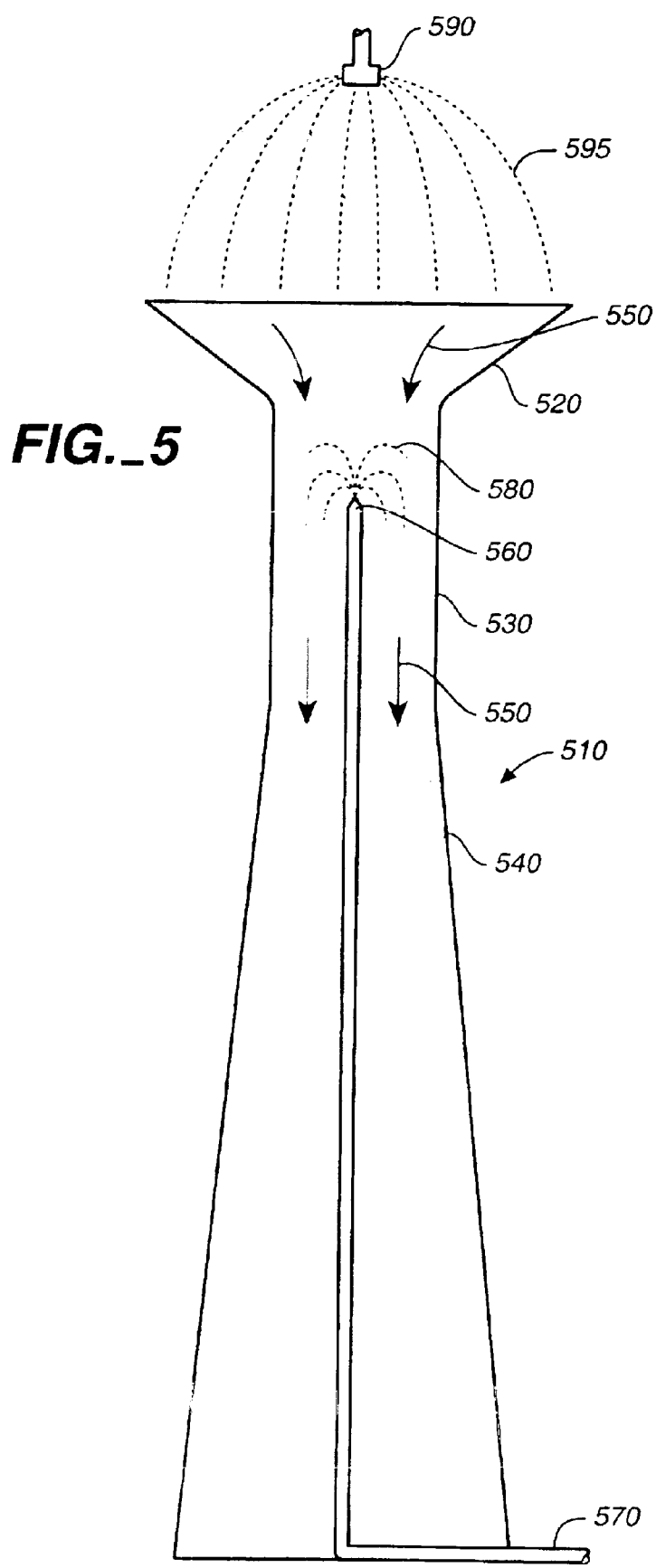
FIG._5

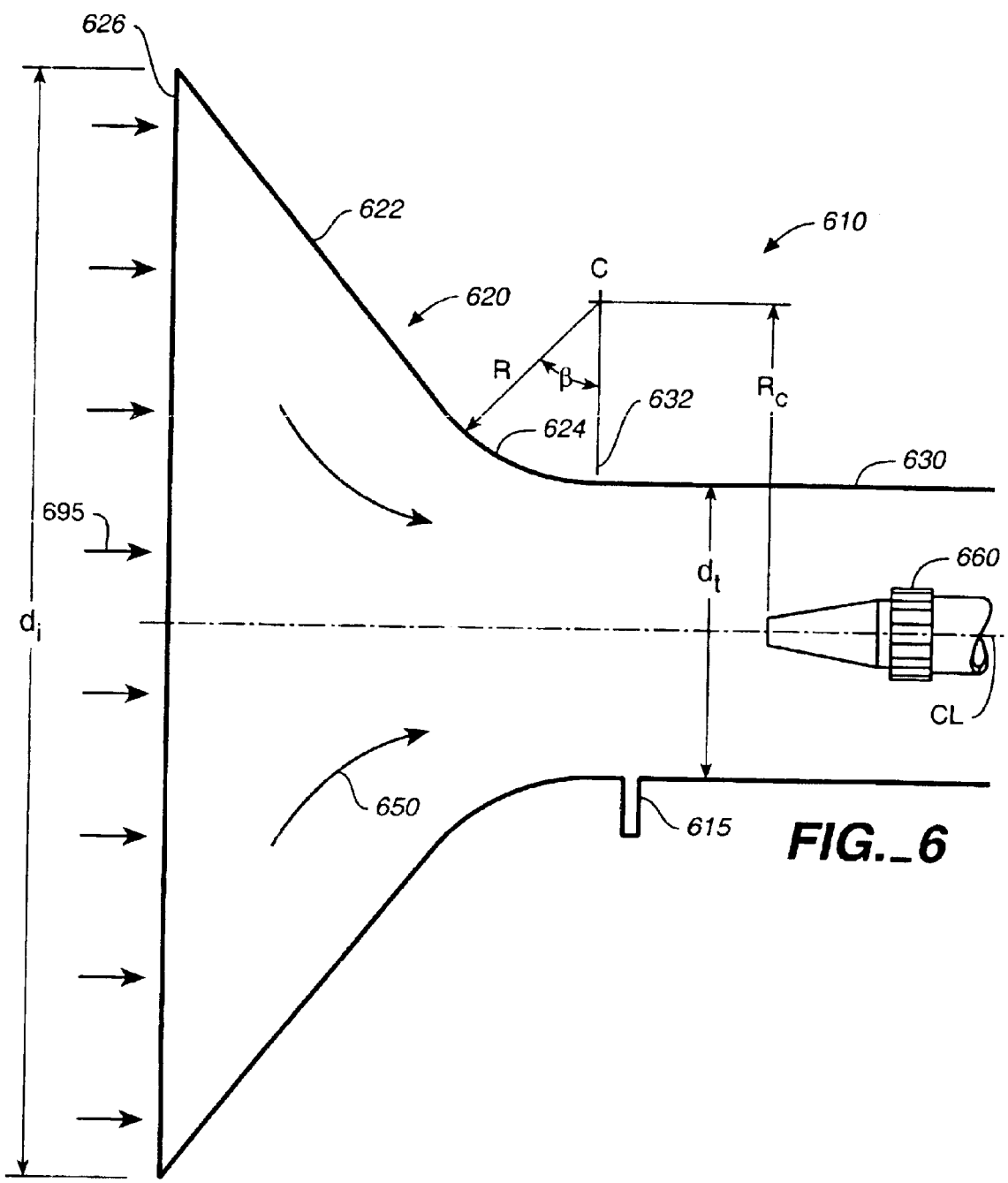
FIG._6

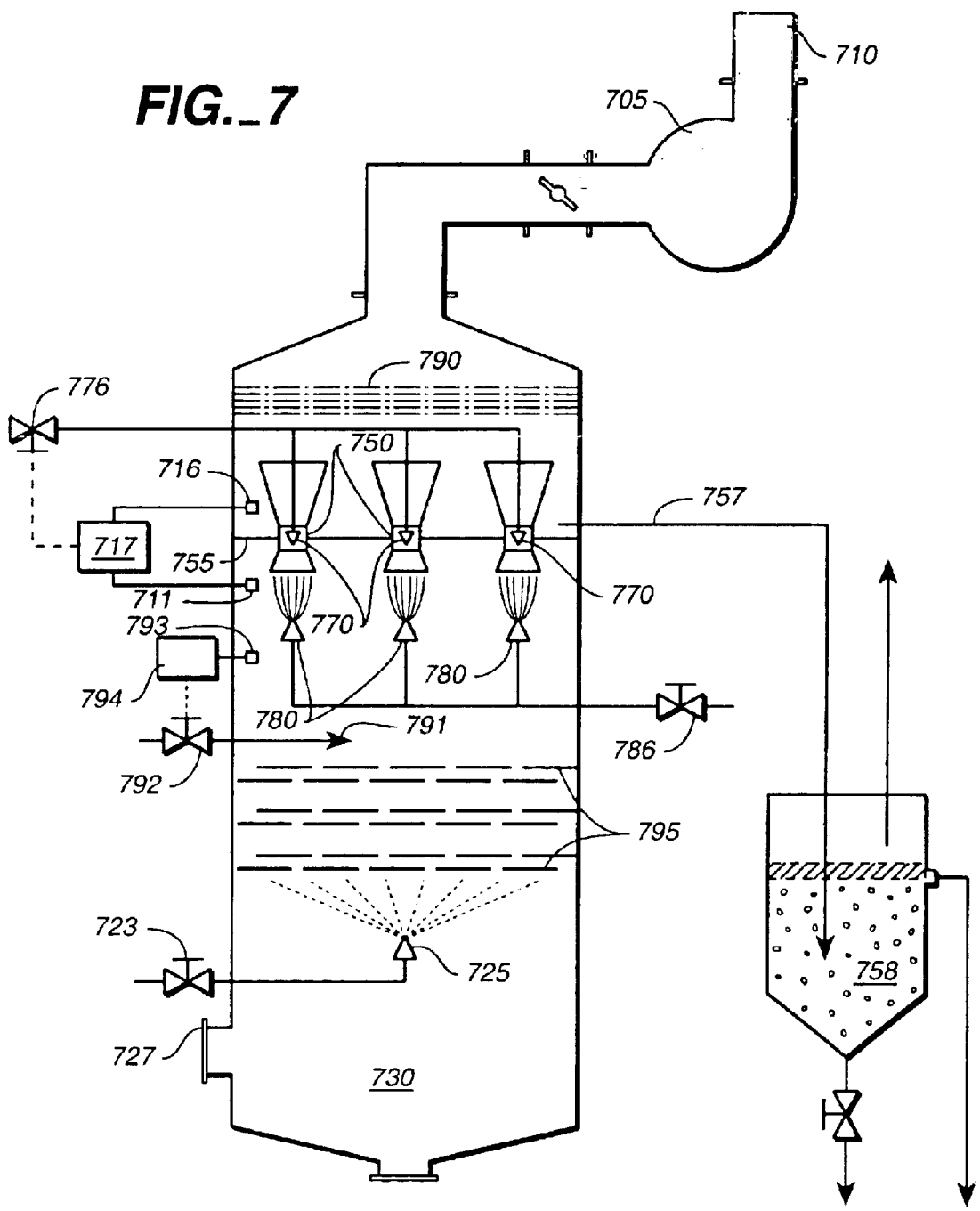
FIG._7

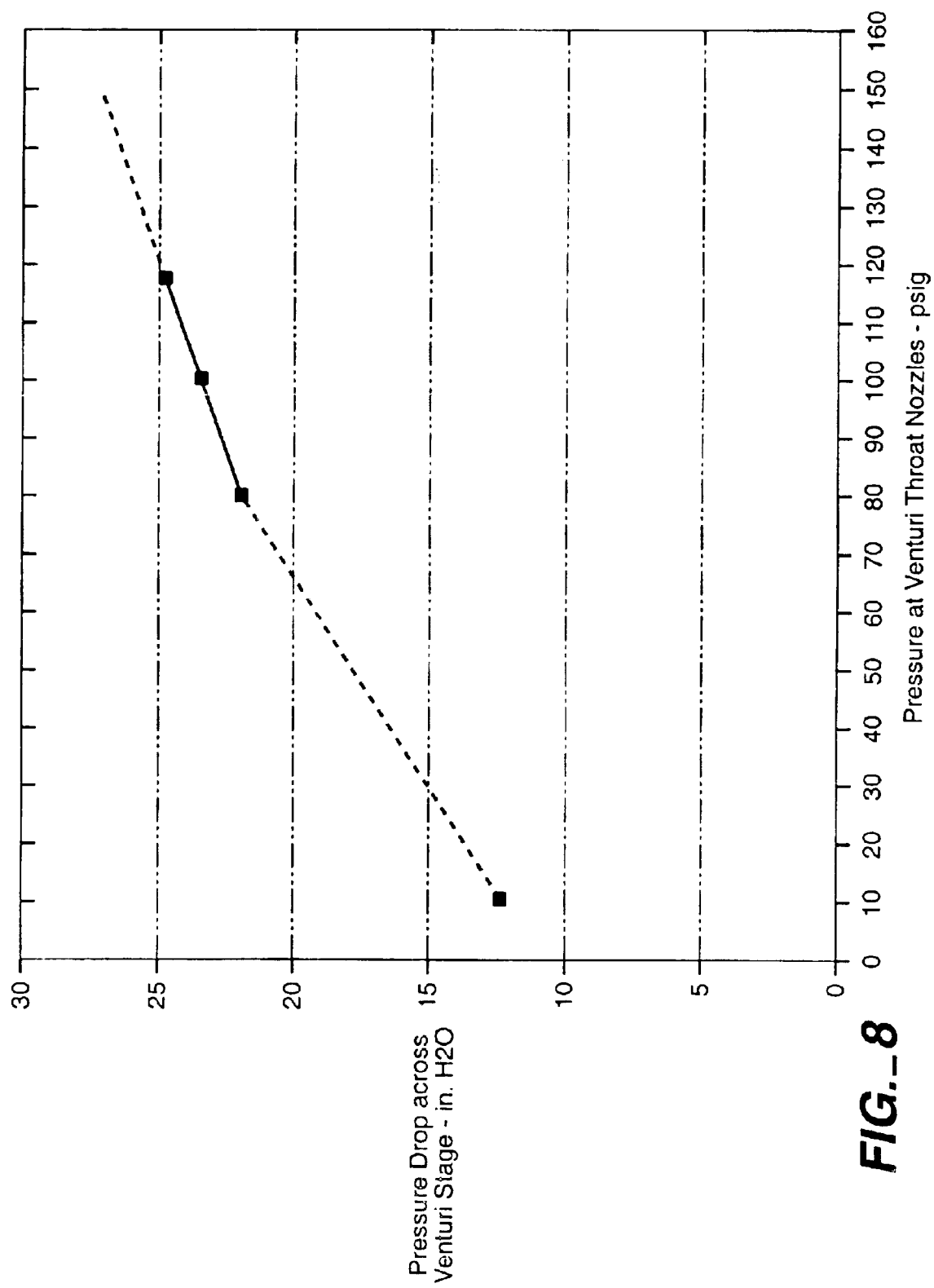
FIG._8

VENTURI AND METHODS FOR PARTICULATE REMOVAL WITH COUNTERFLOW SPRAYS

CROSS-REFERENCE TO RELATED APPLICATIONS

This application is a Continuation-in-part of U.S. patent application Ser. No. 09/577,691 entitled "Venturi Scrubber With Optimized Counterflow Spray," filed on May 22, 2000, now U.S. Pat. No. 6,383,260.

FIELD OF THE INVENTION

This invention relates to the field of air pollution control, and is particularly directed to an improved venturi scrubbing system for removing contaminants from a gaseous effluent stream, such as the output of an incinerator.

BACKGROUND OF THE INVENTION

Over the past several decades the control of air pollution has become a priority concern of society. The United States, and other countries, have developed highly elaborate regulatory programs aimed at requiring factories, and other major sources of air pollution, to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, and so there is also a constant demand for more efficient technologies.

Concerns about pollution control are directed to more than air pollution, and removing contaminants from one medium frequently results in their introduction into another. For example, the treatment of municipal wastewater under the Clean Water Act has resulted in an enormous increase in the amount of sewage sludge that must be disposed of. Many communities lack adequate disposal sites to discard sludge that is generated by their municipal wastewater treatment plants in landfills, and are turning to incineration as an alternative method of disposal. Incineration of sludge, or other waste products, while greatly reducing the volume of material that must be disposed of on land, may result in the release of contaminants in the sludge into the atmosphere. In this regard, it is noted that the sludge generated by many municipalities is contaminated by highly toxic heavy metals and organic compounds, as well as acidic compounds such as chlorides and sulfates. The release of such compounds into the atmosphere is highly regulated, and sludge incineration systems are required to use BACT for controlling the release of contaminants into the atmosphere.

One well-known type of device for removing contaminants from a gaseous effluent stream is a venturi scrubber. Venturi scrubbers are generally recognized as having the highest fine particle collection efficiency of available scrubbing devices. As the name implies, in a venturi scrubber the effluent gas is forced or drawn through a venturi tube having a narrow "throat" portion. As the gas moves through the throat it is accelerated to a high velocity. Droplets of a scrubbing or cleansing liquid, typically water, are created in the venturi, usually in the vicinity of the throat, and enter the gas flow. The droplets used are generally many orders of magnitude larger than the contaminant particles to be collected and, as a consequence, accelerate at a different rate through the venturi. The differential acceleration causes interactions between the droplets and the contaminant particles, such that the contaminant particles are collected by the droplets. The collection mechanisms involve, primarily, collisions between the particles and the droplets and diffusion of particles to the surface of the droplets. In either case, the particles are captured by the droplets. Depending on the size of the contaminant particles, one or the other of these mechanisms may predominate, with diffusion being the predominant collection mechanism for very small particles, and collision or interception being the predominant mechanism for larger particles. A venturi scrubber can also be efficient at collecting highly soluble gaseous compounds by diffusion. A detailed description of these scrubbing mechanisms is discussed in Chapter 9 of Air Pollution Control Theory, M. Crawford, (McGraw-Hill 1976).

After the particulate contaminants are collected by the scrubbing droplets, the droplets are then removed from the effluent stream which is thereby cleansed. Removal of the droplets may be accomplished by a number of known means, which typically rely on the fact that the scrubbing liquid droplets are relatively large and, due to inertia, cannot change direction rapidly. Thus, to remove the droplets, the gas flow may be directed toward a surface such as an impingement plate. While the gas moves around the surface, the inertia of the relatively large droplets causes them to strike the surface where they are captured. Likewise, the droplets may be captured by a circular flow, as in a cyclonic separator, where the relatively large droplets collide with the wall of the separator due to centrifugal force.

Most venturi scrubbers in use today are "self-atomizing," i.e., the droplets are formed by allowing a liquid to flow into the throat of the venturi where it is atomized by the gas flow. When operated at their design conditions, these systems are not able to produce droplets of very small mass median diameter, typically 500–2000 microns.

The primary methods heretofore utilized in improving the collection efficiency of a venturi scrubber have been to decrease the size of the throat or to increase the overall rate at which gas flows through the system. Both of these methods increase the differential velocities between the contaminant particles and liquid droplets as they pass through the throat of the venturi. This causes more interactions between particles and droplets to occur, thereby improving contaminant removal. However, increasing the collection efficiency in this manner comes at a cost of significantly higher energy input into the system, thereby resulting in higher operating costs. The extra energy is expended due either to the increased overall flow resistance attributable to the reduced throat diameter, or to the increased overall flow rate through the venturi. In either case, the pressure drop across the venturi is increased and greater pumping capacity is required. Most prior art efforts to increase the fine particle collection efficiency of a venturi scrubber have involved substantial increased energy input into the system.

Of particular concern to those in the field of air pollution control is the collection of "optically active" particles. As used herein, the term "optically active particles" should be understood to mean particles having a diameter in the range of approximately 0.1 to 1.0 microns. In an effort to control these particles, the EPA has recently set "PM2.5 standards" for the emissions of particles less of than 2.5 microns. These particles are difficult to collect in conventional venturi scrubbers due to their small size. Nonetheless, particles in this size range often comprise toxic material the release of which is not permitted. Due to the relatively large surface area of optically active particles, they absorb a disproportionate amount of heavy metal contamination. As their name implies, optically active particles interact with light. Even if they do not contain toxic components, the emission of optically active particles is highly visible and undesirable from an aesthetic point of view.

As noted above, municipal sewage sludge often contains significant amounts of toxic heavy metal and organic materials. Heretofore, scrubbers have not been efficient in removing these materials from the gaseous effluent of incinerated sludge. Municipal sewage sludge incineration typically requires the use of high temperatures (i.e., between 900°–1,600° F.). At these elevated temperatures, the organic materials are vaporized and are, thus, not susceptible to efficient scrubbing. One approach to this problem has been to use an afterburner on the effluent stream, whereby the organic vapors are combusted and, thereby, transformed into non-toxic compounds, primarily water vapor and carbon dioxide. However, incomplete combustion of the organics can result in the production of carbon monoxide, soot, and/or gaseous hydrocarbons. If soot (i.e., fine particles of carbon) is produced, other compounds, such as those containing heavy metals, can be adsorbed on the surface of the carbon particles. Any particles that are formed in this way are likely to be difficult to collect due to their small diameter. And, as noted above, very small particles are efficient collectors of volatile heavy metals.

In co-assigned U.S. Pat. No. 5,279,646, (hereafter the '646 patent) by the inventor hereof (the disclosure of which is incorporated by reference), it is taught to optimize the size of the scrubbing droplets to promote the maximum collection efficiency for optically active contaminant particles. This patent describes the fact that there is a point at which a further decrease in the size of the droplets of the scrubbing liquid begins to become detrimental. The '646 patent teaches a method and apparatus for creating optimized droplets which are introduced into the effluent gas flow upstream of the venturi throat. The '646 patent further teaches the use of a two-fluid nozzle to create droplets of a scrubbing or cleansing liquid. The inventive apparatus and method of the '646 patent have proven to be quite successful when using the preferred two-fluid nozzle.

The '646 patent notes that certain hydraulic (i.e., liquid only) nozzles are capable of producing droplets in the optimal range and could be used in practicing the invention described in the patent. However, as a practical matter, it has proven difficult to achieve all of the objectives of the '646 patent when using a hydraulic nozzle.

As noted, the trend in pollution control has been towards increased stringency, such that many existing facilities face the need to upgrade or retrofit their existing pollution control equipment to achieve better results. In addition, facility owners/operators are often interested in upgrading or retrofitting existing pollution control equipment to realize the benefit of lower operational costs from improved efficiency.

In many situations, when retrofitting or upgrading an air pollution control system it is difficult due to space or power considerations to provide the pressurized air needed to operate the two-fluid nozzles described in the '646 patent. Therefore, in such situations, it is difficult to realize the benefits described in the patent.

What is desired is an apparatus and method that permits the efficient and economical scrubbing of fine particles from a gas flow using a cleansing liquid in a venturi scrubber. Specific needs include reduced scrubbing liquid pumping requirements, lower pressure drop across the venturi, improved scrubber performance, and better control of the pressure drop across the venturi scrubber.

SUMMARY OF THE INVENTION

The present invention generally comprises an apparatus and method to create a spray of fine droplets composed of a scrubbing liquid for scrubbing particulates from a contaminated gas. The scrubber includes a venturi having an inlet for receiving a contaminated gas, a throat and an outlet.

It is one aspect of the present invention to provide a venturi scrubber having a first nozzle to introduce fine droplets of a first cleansing liquid into the gas flow, and positioned upstream of the throat; and a second nozzle to introduce fine droplets of a second cleansing liquid into the gas flow, and positioned within said throat and oriented to introduce droplets with a component of velocity which is counter to the direction of gas flow through the venturi.

It is another aspect of the present invention to provide a means for introducing fine droplets of a first cleansing liquid into said flow of gas through the venturi and upstream of the throat; and means for introducing fine droplets of a second cleansing liquid into the throat in a direction counter to the direction of gas flow through the venturi.

It is yet another aspect of the present invention to provide a venturi scrubber including a nozzle to introduce fine droplets of a cleansing liquid into said gas flow, where said droplets are introduced into said throat with a component of velocity which is counter to the direction of gas flow through said venturi, and where the flow of said cleansing liquid is selected so that the pressure drop across said venturi scrubber is approximately equal to a specified pressure drop.

It is an aspect of the present invention to provide a method of cleansing a gas flow using a venturi scrubber at a prescribed pressure drop across a venturi. The method includes the steps of injecting fine droplets of cleansing liquid counterflow to the gas flow and into the throat, and where the flow of cleansing liquid has a valve to adjust the flow; and adjusting the valve to maintain said prescribed pressure drop across the venturi.

It is yet another aspect of the present invention to provide a method of providing a retrofit for a pre-existing venturi scrubber in an air pollution control system, where the pre-existing venturi has a prescribed pressure drop. This method includes the steps of installing components within said pre-existing venturi including a nozzle to introduce fine droplets of a cleansing liquid into the throat of the venturi with a component of velocity which is counter to the direction of gas flow through the venturi; and selecting the flow rate of cleansing liquid so that the pressure drop across said venturi is approximately equal to the prescribed pressure drop.

A further understanding of the invention can be had from the detailed discussion of specific embodiments below. For purposes of clarity, this discussion refers to devices, methods, and concepts in terms of specific examples. However, the method of the present invention may operate with a wide variety of types of devices. It is therefore intended that the invention not be limited by the discussion of specific embodiments.

Additional objects, advantages, aspects and features of the present invention will become apparent from the description of preferred embodiments, set forth below, which should be taken in conjunction with the accompanying drawings, a brief description of which follows.

BRIEF DESCRIPTION OF THE DRAWINGS

FIG. 1 is a schematic cross-sectional diagram of the venturi scrubber of the present invention.

FIG. 2 is a schematic cross-sectional diagram of the throat of an embodiment of the venturi scrubber of the present invention showing the spray pattern in the absence of a gas flow through the throat.

FIG. 3 is a schematic cross-sectional diagram of the throat of an embodiment of the venturi scrubber of the present invention showing the spray pattern in the presence of a gas flow through the throat.

FIG. 4 is a schematic cross-sectional diagram of the throat of an alternative embodiment of the venturi scrubber of the present invention comprising a plurality of nozzles.

FIG. 5 is cross-sectional diagram of an embodiment of the venturi scrubber of the present invention having both a counterspray nozzle and an upstream spray nozzle.

FIG. 6 is a cross-sectional diagram of a preferred embodiment of a venturi scrubber with details of the venturi scrubber inlet and counterflow spray nozzle.

FIG. 7 is a partially schematic cross-sectional view of a preferred embodiment of an air pollution control system according to the present invention.

FIG. 8 is a chart showing the change in pressure drop across a venturi of a dual spray system from changes in the pressure of liquid to a counterflow nozzle.

DETAILED DESCRIPTION

The present invention is directed to a venturi scrubber for cleansing a gas flow, such as a pollution source, which is capable of removing optically active particles from the gas flow, using a spray from a hydraulic nozzle positioned within the throat of the venturi and oriented to eject droplets of a scrubbing liquid counter to the direction of gas flow through the venturi.

Turning first to FIG. 1, a venturi scrubber 10 according to the present invention is shown. As is known, venturi scrubber 10 comprises an inlet "cone" 20, a throat 30 and an outlet cone 40. Preferably, venturi 10 is axially symmetrical such that, for example, throat 30 is cylindrical. However, other configurations are possible. For example, venturi 10 may, alternatively have a rectangular cross section normal to the gas flow direction depicted by arrows 50. While inlet 20 is described for convenience as a cone, in the embodiment depicted the wall of the inlet is not truly conical. Rather, as depicted inlet 20 has a curved wall. The curved venturi inlet 20 depicted is referred to as a "bellmouth" inlet and is known to be a low static pressure loss inlet.

As is well-known, as the gas flow 50 travels through venturi 10 it is accelerated by the reduced diameter of inlet 20 and throat 30, and then decelerates as the diameter increases in outlet cone 40. As described above, the process of accelerating and decelerating gas flow 50 facilitates interactions between droplets of a scrubbing liquid and particles in the gas flow, such that contaminant particles are captured by the droplets and removed from the gas flow with high efficiency.

A scrubbing liquid is introduced through liquid inlet 70 to a hydraulic nozzle 60 mounted within throat 30 of venturi 10, such that the spray 80 from nozzle 60 has a component of its velocity which is counter to gas flow 50, i.e., in a direction along the axis of the venturi opposite to the direction of gas flow. Hereinafter, when reference is made to spraying or ejecting droplets "counter" to the direction of gas flow, it is intended only that the sprayed or ejected droplets leaving the nozzle have a component of their velocity which is counter to the gas flow. In one embodiment of the invention, the water pressure to the nozzle is in the range of about 80–320 psig, and the nozzle produces fine droplets in a hollow cone spray. Preferably water is injected at a rate of about 1–10 gallons per 1,000 actual cubic feet (ACF) of gas.

As described, nozzle 60 produces a hollow spray 80, such that most of the scrubbing liquid is ejected in a conical pattern having an included angle α, which is preferably in the range of 90°–150°. As depicted in FIG. 2, under static conditions, the droplets in spray 80 will travel linearly until they intercept the wall of venturi throat 30. However, as depicted in FIG. 3, in the presence of gas flow 50, the trajectories of the droplets in spray 80 become curved as the droplets become entrained in the gas flow. The trajectory of a particular droplet will depend primarily on its size and ejection velocity. It will be appreciated that the use of a spray injected counter to the gas flow, in accordance with the present invention, maximizes the differential velocity between the gas flow and the droplets of scrubbing liquid. This enhances the particle scrubbing efficiency. At the same time, the use of a spray which has a component which is radial to the venturi axis promotes the uniform distribution of droplets in the gas flow as it transits the venturi.

Because of their relatively greater momentum (and lower relative drag) larger droplets, and droplets with a higher initial ejection velocity, will travel farther laterally (i.e., towards the wall of venturi throat 30), than smaller, lower velocity droplets. In accordance with the present invention, this natural sorting and distribution of the droplets according to their initial momentum ensures that spray 80 is relatively evenly distributed within throat 30 of venturi scrubber 10, as shown in FIG. 3. Preferably, the nozzle, the scrubbing liquid pressure and the venturi dimensions are selected so that spray droplets of appropriately small diameter are distributed throughout the entire venturi throat 30 over the range of gas flows encountered in the scrubbing system. In one aspect of the present invention, a controller is used to adjust the nozzle pressure with changes in the gas flow, to ensure even distribution of spray droplets under different flow conditions.

It is considered acceptable that very large droplets, representing only a small percentage of the volume of injected scrubbing liquid, will travel all the way to wall 30. The loss of large droplets, which do not efficiently scrub the gas flow, is not considered consequential as long as a large volume of scrubbing liquid is not being lost.

In most applications, the preferred scrubbing liquid is water due to its near universal availability, low cost and relative ease of handling. In some applications it may be desirable to incorporate into the water one or more other chemicals selected to react with gaseous substances in the gas flow. For example, if the gas flow is highly acidic, it may be desirable to use a water-based solution or mixture which neutralizes the acid components in the gas. In specialized applications other scrubbing liquids can be employed, and the specific scrubbing liquid used is not important to the present invention, although the physical properties of the liquid, such as the viscosity, may effect the selection and placement of the nozzle insofar as the physical properties affect the formation of droplets.

As the diameter of the venturi throat is increased, it becomes more difficult to produce a spray which uniformly covers the entire throat diameter using a single nozzle.

Accordingly, when a larger diameter venturi is desired, a nozzle array may be used in the venturi throat rather than a single nozzle. Such a nozzle array may comprise, for example, seven nozzles, six of which are positioned at the corners of a hexagon having its center located on the axis of the venturi with the seventh nozzle positioned on the axis. FIG. 4 is a schematic cross-sectional diagram of an embodiment of the present invention comprising seven nozzles, 60*a*–60*g*; six of the nozzles are placed at the points of a hexagon with the seventh being positioned in the center, on the axis of the venturi throat. In the preferred embodiment, the points of the hexagon are derived by fitting seven equal-sized circles, each having a diameter of one-third of the venturi throat diameter, into a circle having the throat diameter. The points of the hexagon are at the centers of the outer six circles.

Suitable hydraulic nozzles for use in the present invention may be obtained from BETE Fog Nozzle Inc., 50 Greenfield Street Greenfield, Mass. 01301; (URL—http://www.bete.com/). In one embodiment, a model TF8W nozzle was used with a ¼ inch pipe at a water pressure of approximately 200 psi. At this pressure the nozzle ejects almost six gallons of scrubbing liquid per minute. This nozzle ejects a conical spray having an included angle of approximately 120°. The preferred nozzle produces water droplets having a median diameter of 100 microns, with 80% of the volume of the droplets being in the range of 50–180 microns in diameter when operated at a pressure of 200 psig. As used herein, when referring to the diameter or median diameter of the droplets in the spray, applicant intends to refer to what is more precisely termed the volume median diameter (VMD), which is sometimes referred to as the median volume diameter (MVD). Droplets in the size range of 10 to 200 microns VMD, when used in connection with the present invention, produce excellent scrubbing efficiency as described in further detail below.

A test of the effectiveness of a counterflow spray in a venturi scrubber was conducted in connection with an existing municipal sewage sludge fluid bed incineration unit. The existing unit included a traditional, self-atomizing spray, introduced upstream of the venturi throat, where the venturi has a 40" pressure drop, which was replaced in the test with two venturi scrubber elements having counterflow sprays, as described above. In operation, the old venturi had overall particulate emissions of about 0.004 gr/dscf, while the new system had an overall emissions of about 0.0009 gr/dscf at a 20" pressure drop and approximately 100 psig water pressure to BETE TF6W nozzles, one in each venturi throat.

While the use of a counterflow spray alone in a venturi is thus seen to have advantages over a traditional upstream spray, additional improvements in venturi scrubber operation, described subsequently, may be achieved with a counterflow spray alone, or through a dual spray injection system wherein one or more counterflow sprays are injected into the venturi throat while one or more sprays are injected upstream of the throat.

FIG. 5 shows a cross-sectional diagram of one embodiment of the dual spray injection system of the present invention. Venturi scrubber 510 comprises an inlet cone 520, a throat 530 and an outlet cone 540. As described for venturi scrubber 10, venturi 510 is preferably axially symmetrical, though other configurations are within the scope of the present invention, such the venturi having a rectangular cross section normal to the gas flow direction depicted by arrows 550.

An upstream scrubbing liquid is introduced through nozzle 590 mounted upstream of throat 530. Nozzle 590 produces a fine mist of droplets in spray 595 that, due to the proximity to inlet 520, generally follow flow 550 through the nozzle. Nozzle 590 and the scrubbing liquid are selected according to the droplet size, spray distribution, droplet velocity, and scrubbing abilities of the liquid. Important spray properties include droplets of a size, velocity and distribution that promote scrubbing interactions between the spray and gas. Thus nozzle 590 should produce a spray that is preferably distributed across the flow area. In addition, the droplets should promote scrubbing by being be small enough to have a large total surface area yet large enough to maintain a velocity differential between particles in the gas and the droplets. Droplets in the size range of 10 to 200 microns VMD have been found to be particularly useful in this regard. For scrubbing particles in the gas, water is a preferable scrubbing liquid, while chemical additives may be included in the scrubbing liquid to react with the particles or reactive vapors in the gas.

Examples of acceptable nozzle types for nozzle 590 include one or more air-assisted nozzles or hydraulic bypass nozzles, as described in the '646 patent. Hydraulic nozzles as typically used do not produce droplets suitable for upstream injection and in the required size range of 10 to 200 microns VMD, as described in the '646 patent. However, the inventor has discovered that this size range of droplets can be achieved with hydraulic nozzles that are operated at liquid pressures higher than those specified for normal operation, and by selecting nozzles with spray angles of 60° or more. Suitable hydraulic nozzles include, but are not limited to, those sold by BETE Fog Nozzle Inc., such as BETE MP series nozzles of the smaller sizes (models 125, 156, 187, 218, and 250) with spay angles of 60°, 90° or 120°. Operating these nozzles at pressures much greater than those specified by the manufacturer, for example greater than about 120 psi over the specified pressure of 3–80 psi, results in a fine mist suitable for upstream injection into a venturi scrubber of the present invention.

Nozzle 590, or alternatively more than one nozzle, preferably operates with water as the scrubbing liquid at a total liquid flow rate into the venturi of about 1–7 gallons per 1,000 ACF of gas, and generates a spray 595 of droplets in the range of 10 to 200 microns VMD.

A counterflow scrubbing liquid is introduced through liquid inlet 570 to a nozzle 560 mounted within throat 530 of venturi 510, such that the spray 580 is a counterflow spray. Nozzle 560 is preferably a hydraulic nozzle as previously described. Spray 580 is preferably water injected at a rate of about 1–10 gallons per 1,000 ACF of gas, and the spray 580 is composed of droplets in the range of 40 to 200 microns VMD. As one example of a hydraulic nozzle that produces acceptable results for the dual spray injection system of the present invention is the BETA TF series 120° hollow cone nozzles of small size, such as a TF-8W, operated at pressures of 75–300 psig.

A preferred embodiment of a venturi 510 is shown in FIG. 6 as venturi 610, which includes an inlet 620, a throat 630, and an outlet similar to outlet 540, but not shown. A static pressure tap 615 is provided within throat 630. Inlet 620 and throat 630 are axial symmetric about centerline CL, as are gas streamlines 650, shown for reference. Throat 630 is cylindrical with a diameter $d_t$, and extends from an upstream plane 632 downstream to the outlet (not shown). Inlet 620 includes an opening 626 for receiving a flow 695, a conical section 622 having an inlet diameter $d_i$, and a toroidal section 624 that makes a smooth transition from the conical section to the cylindrical surface of throat 630. A counterflow spray nozzle 660 is located within throat 630. Toroidal section 624 is a surface formed by rotating, about centerline CL, an arc having an included angle β, a radius R, and a center C positioned a distance $R_C$ from centerline CL in plane 632. Preferred dimensions are $R_C=(5/6)d_t$; $R=d_t/3$; $d_i=2.5d_t$; and β≈53°.

A venturi scrubber having a dual spray injection system has several features that improve the ability of the venturi scrubber to operate over a wider range of gas flow rates that is possible with only an upstream or a counterflow spray. Changes in operation of an incinerator, for example, will result in changes in the gas flow through a venturi scrubber. For given spray conditions (drop size, velocity and density), decreased venturi gas flow rates can have deleterious effects on scrubber efficiency, as the efficiency generally depends on the velocity differential between the spray droplets and the gas in the venturi. In addition, decreased venturi flow rates decrease the pressure drop across the venturi, which may have an impact on meeting air pollution control regulations.

The effects of decreased gas flow rate through a venturi scrubber can be countered by controlling the sprays injected into the venturi. Thus, for example, a counterflow spray injected into the throat of a venturi scrubber, with our without the injection of an upstream spray, has several effects on the flow through the venturi and on the scrubbing effectiveness of the spray. As previously noted, an increased counterflow rate produces droplets that are effective at scrubbing, since they have a high velocity relative to the oncoming venturi gas flow. In addition, an increased counterflow spray momentum may increase the flow rate of gas through the venturi, further increasing the ability of any spray droplets in the contaminated gas flow. Also, an increased counterflow rate increases the pressure drop across the venturi, and thus provides a means for manipulating the pressure drop.

FIG. 7 shows an embodiment of an air pollution control system employing a venturi scrubber which include automatic control functions to adjust the operation of the system to compensate for variations in the effluent flow. Many of the components of the system of FIG. 7 are presented in of FIG. 8 and the discussion thereof in co-owned U.S. Pat. No. 5,759,233 ("the '233 patent"), incorporated herein by reference. Specifically, the portions of the air pollution control system including the selection and treatment of scrubbing liquids, the treatment of gases before and after the venturis, and post scrubbing treatment of the scrubbing liquid, including alternative embodiments thereof, are those described in the '233 patent. The main difference in the embodiment shown in FIG. 7 of the present application and the embodiment referred to in the '233 patent is the incorporation and control of inventive dual spray injection system of the present invention. A brief discussion of the overall air-pollution control system is thus presented, followed by a more detailed discussion of those features that are unique to the present invention.

A contaminated flow of particle-laden effluent gas enters enclosed chamber 730 through inlet 727. As described in the '233 patent, the effluent gas may be from a multiple-hearth furnace used to incinerate sludge from a municipal wastewater treatment works. Such a source of effluent gas will vary both in the volume of flow and in the characteristics of the flow. Upon entering chamber 730, the effluent flow first travels through a subcooling region, including three impingement plates 795. As described in the '233 patent, three stages of impingement plates 795 both serve to aid in the cooling of the gas flow and to remove larger particulates from the gas flow. A spray of cooling liquid is introduced into the gas flow upstream of impingement plates 795 by nozzle 725 that is controlled by valve 723. Liquid is also injected into the system above impingement plates 795 by liquid feed 791 controlled by valve 792.

After passing through impingement plates 795, the cooled effluent travels through venturi scrubbers 750, which are fed by upstream spray nozzles 780 and counterflow spray nozzles 770. Thereafter, the spray droplets are captured by demister 790 that serves to reconsolidate the scrubbing liquid. Demister 790 is, preferably, of the type that has a high efficiency in removing very fine droplets, such as one employing a mesh. After the scrubbing droplets have been removed, the cleansed effluent gas, which is propelled through the system by induced draft fan 705, may be expelled into the atmosphere through stack 710 or further processed.

Chilled liquid may also be used for subcooling the effluent flow prior to its passage through the venturi stage. Automatic control according to the present invention may also be used for this purpose. In one embodiment, the temperature of the effluent flow in the system is monitored at a point between the final impingement plate and the entrance to the venturi stage. A temperature sensor 793 is shown in FIG. 7. Temperature sensor 793 is read by control means 794, and if the temperature rises the volume of liquid introduced by valve 792 is increased. Although more complex, those skilled in the art will appreciate that the temperature of the liquid introduced may also be adjusted.

Contaminated droplets of the scrubbing liquid are consolidated by demister 790 and flow under the influence of gravity down to tray 755 which separates the inlet ends of venturis 750 from the outlet ends. Tray 755 prevents any further downward flow of the contaminated spray liquid. Drain line 757 provides a flow path for the liquid which collects upon tray 755, carrying it to enclosed container 758, where it may be further treated as explained in the '233 patent.

In one embodiment of the present invention, each venturi 750 is adapted for scrubbing a gas, as in venturi 510. Hydraulic nozzles are preferred for nozzles 770 and 780, though air-assisted nozzles or hydraulic bypass nozzles, as discussed in the '233 patent, could be substituted for nozzle 780. The flow of scrubbing liquid to nozzles 770 and 780 is controlled by a counterflow spray flow valve 776 and an upstream spray flow valve 786, respectively. Preferably the same liquid is supplied to each of nozzles 770 and 780, though alternatively each set of nozzles could have different liquids supplied thereto.

The control of the embodiment of an air pollution control system shown in FIG. 7 employs an automatic control to adjust the operation of the system to compensate for or to produce a specified pressure drop or pressure differential across the venturi. The differential pressure is measured as the difference between the output of a pressure gauge located upstream of the venturi, as measured by an upstream pressure gauge 711, and a pressure gauge located downstream pressure gauge, as measured by a downstream pressure gauge 716. The pressure differential between the pressure taps 711 and 716 is measured by valve control module 717 which, in turn, automatically adjusts valve 776 to change the amount of water flowing to nozzles 770 and thus the total volume of counterflow spray into venturis 750.

Control of the pressure drop may be accomplished as follows. When the flow through the venturi decreases, the acceleration of gases passing through the venturi likewise decreases. This adversely affects scrubbing efficiency that is related to the differential acceleration of the gases and the liquid droplets as they pass through the venturi. As noted above, the addition of counterflow spray increases the pressure drop across the venturi. Thus, in accordance with one embodiment of the present invention, when the system detects a reduced effluent gas flow (measured, for example, by a drop in pressure across the venturi, or by other measurements indicative of or directly measuring the gas velocity), control module 717 responds by adjusting valve 776 to increase the volume of counterflow spray liquid which is introduced into the throat of each venturi 750.

In an alternative embodiment, control module 717 is adapted to operate such that the pressure drop it at a specified value or within specified limits. In this case, control module 717 increases the flow through valve 776 in response to a decrease in pressure drop below a preset limit, and decrease the flow in response to an increase in the pressure drop.

In an alternative embodiment, the differential pressure can be measured as the difference between the static pressure at the throat, as measured though a pressure tap such as static pressure tap 615, and either an upstream or downstream pressure gauge. Since the differential pressure as measured using this method is related to the pressure drop across the venturi, a control system, for example, could use it as an indication of the pressure drop across the venturi.

The embodiment of FIG. 7 was tested in an incinerator burning municipal sewage sludge. The air pollution control system that was in place prior to the test used only an upstream water spray formed from air-assisted nozzles and had an outlet emissions level of ~9 mg/m$^3$ (~0.004 gr/acf) measured optically and by particulate sampling, and the venturi had a pressure drop of 30" of water as measured across the venturi (between the inlet and outlet). The test included replacing the air-assisted upstream nozzles with hydraulic BETE MP 125W nozzles at a pressure 140 psig, resulting in droplets of ~155 micron VMD, and hydraulic BETE TF 10W counterflow nozzles supplied with water at 80 to 120 psig. The resulting system had outlet emissions of 3–5 mg/m$^3$ (~0.002 gr/acf) measured optically operating at a venturi pressure drop of 22–25" of water.

The system was further tested by reducing the pressure to the counterflow spray nozzles to 10 psig while maintaining a constant pressure and flow rate to the upstream spray nozzles (~140 psig and ~40 gpm, respectively) and constant gas flow rate. The resulting pressure drop across the venturi stage was reduced to ~12 in H$_2$O, and the output emissions increased to ~7 mg/m$^3$ (~0.003 gr/acf) measured optically. It is clear that an increase in the amount of counterflow liquid can be used to increase the capture of particulates. In practice, decreased particulate capture from decreased gas flow rates can be countered by increasing the amount of counterflow liquid injected into the venturi. This can be done with increasing the amount of upstream flow, as in the '233 patent, or providing extra compressed air to atomized the additional flow through an air-assisted nozzle.

A venturi scrubber having upstream and downstream counterflow sprays also provides greater flexibility to control the pressure across the venturi. FIG. 8 shows the increase in the pressure drop across the venturi with the supply pressure to the counterflow nozzles (which in turn is proportional to the mass flow rate through the counterflow nozzles). The change in the counterflow spray did not noticeably affect the pollution reduction, and thus provides an independent control of the pressure through the venturi. In some circumstances it is desirable to operate the venturi at approximately constant pressure drop over a range of gas flow rates, an increased counterflow can be used to restore the pressure drop across the venturi resulting from a lower flow rate. Thus, for example, if a high "turn down" capability is required, the flow in the counterflow spray can be increased and some or all of the pressure drop can be recovered.

The control of the pressure drop across the venturi may be important when retrofitting existing air pollution control systems with new venturis. Continued operation of air pollution control system depends on maintaining permitted pressure drops across wet scrubbing devices (see for example, Environmental Protection Agency 40 C.F.R. §60.153(b)(1) for operation of multiple hearth, fluidized bed, or electric sludge incinerators with wet scrubbers). Upgrading a venturi scrubber to reduce pollution may not meet the regulations for continued operation unless the pressure drop across the wet scrubber is essentially unchanged. Thus replacing a downstream spray nozzle with a counterflow spray nozzle can reduce pollution (as described above), but also reduces the pressure drop across the venturi. As a result, the upgraded venturi would require a new permit. By installing a dual spray system of the present invention, lower pollution levels can be maintained while keeping the pressure drop across the venturi at the permitted level for operation without repermitting.

While the present invention has described in connection with preferred embodiments thereof, it will be apparent to those skilled in the art that there are many variations and equivalents of that which has been described. Accordingly, it is intended that the invention should be limited only by the following claims.

What is claimed is:

1. A venturi scrubber for cleansing a contaminated gas flow, comprising:
   a venturi having an inlet for receiving the gas flow, a throat, and an outlet;
   a first nozzle to introduce fine droplets of a first cleansing liquid into said gas flow, and positioned upstream of said throat; and
   a second nozzle to introduce fine droplets of a second cleansing liquid into said gas flow, and positioned within said throat and oriented to introduce droplets with a component of velocity which is counter to the direction of gas flow through said venturi.

2. The venturi scrubber of claim 1, wherein the flow rate of said second cleansing liquid is selected according to the pressure drop across said venturi scrubber.

3. The venturi scrubber of claim 1, wherein the flow rate of said second cleansing liquid is selected according to the gas flow through said venturi.

4. The venturi scrubber of claim 1, further including a controller adapted to adjust the flow rate of said second cleansing liquid according to the pressure drop across said venturi scrubber.

5. The venturi scrubber of claim 4, further including:
   a pressure-sensing gauge to produce an indication of the pressure drop across said venturi scrubber, where said indication is provided to said controller; and
   a value to adjust the flow rate of cleansing liquid through said second nozzle in response to said controller.

6. The venturi scrubber of claim 5, wherein said controller adjusts said valve to maintain a specified pressure drop across said venturi scrubber.

7. The venturi scrubber of claim 1, wherein said first nozzle is a two-fluid nozzle.

8. The venturi scrubber of claim 1, wherein said second nozzle is a hydraulic nozzle having a radial spray pattern.

9. The venturi scrubber of claim 1, wherein said first cleansing liquid is water or a liquid that neutralizes acidic components of said gas flow.

10. The venturi scrubber of claim 1, wherein said second cleansing liquid is water or a liquid that neutralizes acidic components of said gas flow.

11. The venturi scrubber of claim 1, wherein said first cleansing liquid and said second cleansing liquid are water.

12. The venturi scrubber of claim 1, wherein said droplets introduced by said first nozzle has a diameter of 10–200 microns.

13. The venturi scrubber of claim 1, wherein said droplets introduced by said second nozzle has a diameter of 40–200 microns.

14. A venturi scrubber for cleansing a contaminated gas flow, comprising:
   a venturi having an inlet for receiving a flow of gas to be cleansed, a throat, and an outlet;
   means for introducing fine droplets of a first cleansing liquid into said flow of gas through said venturi and upstream of said throat; and
   means for introducing fine droplets of a second cleansing liquid in to said throat in a direction counter to the direction of gas flow through said venturi.

15. The venturi scrubber of claim 14, further including means for adjusting the flow of said second cleansing liquid to maintain a specified pressure drop across said venturi.

16. The venturi scrubber of claim 14, further including means for adjusting the flow of said second cleansing liquid in response to the pressure drop across said venturi.

17. The venturi scrubber of claim 14, further including means for adjusting the flow of said second cleansing liquid to in response to the rate of the gas flow.

18. The venturi scrubber of claim 14, wherein means for introducing said second cleansing liquid introduces droplets having a diameter of 40–200 microns.

19. A venturi scrubber for cleansing a contaminated flow comprising:
   a venturi having an inlet for receiving a flow of gas to be cleansed, a throat, and an outlet; and
   a nozzle to introduce fine droplets of a cleansing liquid into said gas flow, where said droplets are introduced into said throat with a component of velocity which is counter to the direction of gas flow through said venturi,
   where the flow of said cleansing liquid is selected so that the pressure drop across said venturi scrubber is approximately equal to a specified pressure drop.

20. The venturi scrubber of claim 19, wherein said nozzle is a first nozzle and said cleansing liquid is a first cleansing liquid, and further including a second nozzle to introduce fine droplets of a second cleansing liquid into said gas flow, where said droplets of said second cleansing liquid are introduced upstream of said throat.

21. The venturi scrubber of claim 19, further including:
   a pressure-sensing gauge to produce an indication of the pressure drop across said venturi scrubber; and
   a valve to adjust the flow rate of cleansing liquid through said nozzle in response to said indication of the pressure drop across said venturi scrubber.

22. The venturi scrubber of claim 19, wherein said nozzle is retrofitted into a pre-existing venturi scrubber, and wherein said specified pressure drop is the prescribed pressure drop across said preexisting venturi scrubber.

23. A method of cleansing a gas flow using a venturi scrubber at a prescribed pressure drop across a venturi having an inlet and a throat, comprising the steps of:
   injecting fine droplets of cleansing liquid counterflow to said gas flow and into said throat, and where the flow of cleansing liquid has a valve to adjust said flow; and
   adjusting said valve to maintain said prescribed pressure drop across the venturi.

24. The method of claim 23, further comprising injecting fine droplets of cleansing liquid upstream of said throat.

25. The method of claim 23, wherein said adjusting includes measuring the pressure drop across said venturi.

26. A method of retrofitting a pre-existing venturi scrubber in an air pollution control system, said pre-existing venturi having a prescribed pressure drop, comprising the steps of:
   installing components within said pre-existing venturi including a nozzle to introduce fine droplets of a cleansing liquid into the throat of said venturi with a component of velocity which is counter to the direction of gas flow through said venturi; and
   selecting the flow rate of cleansing liquid so that the pressure drop across said venturi is approximately equal to the prescribed pressure drop.

* * * * *